US006847859B2

(12) United States Patent
Nuebling et al.

(10) Patent No.: US 6,847,859 B2
(45) Date of Patent: Jan. 25, 2005

(54) METHOD FOR LOCATING ARTICLES ON A SUPPORT PLANE

(75) Inventors: Achim Nuebling, Emmendingen (DE); Thomas Kaltenbach, Gutach-Siegelau (DE)

(73) Assignee: Sick AG, Waldkirch/Breisgau (DE)

( * ) Notice: Subject to any disclaimer, the term of this patent is extended or adjusted under 35 U.S.C. 154(b) by 169 days.

(21) Appl. No.: 10/245,599

(22) Filed: Sep. 17, 2002

(65) Prior Publication Data

US 2003/0233166 A1 Dec. 18, 2003

(30) Foreign Application Priority Data

Jun. 14, 2002 (DE) .......................................... 102 26 663

(51) Int. Cl.$^7$ ............................ G06F 7/00; B65G 43/00; B65G 47/00
(52) U.S. Cl. ........................ 700/217; 700/218; 356/602; 198/502.2; 198/502.3
(58) Field of Search ................................ 700/217, 218, 700/223; 356/602, 603, 613, 627, 634, 635, 639; 414/786; 198/502.2, 502.3

(56) References Cited

U.S. PATENT DOCUMENTS

| | | | |
|---|---|---|---|
| 5,412,420 A | | 5/1995 | Ellis |
| 5,501,571 A | * | 3/1996 | Van Durrett et al. ........ 700/217 |
| 5,969,823 A | * | 10/1999 | Wurz et al. .................. 356/639 |
| 5,991,041 A | * | 11/1999 | Woodworth ................. 356/602 |
| 6,061,645 A | * | 5/2000 | Bengala et al. .............. 356/627 |
| 6,064,759 A | * | 5/2000 | Buckley et al. ............. 356/603 |
| 6,260,001 B1 | | 7/2001 | Bengala |
| 6,554,189 B1 | * | 4/2003 | Good et al. ............ 235/462.01 |

FOREIGN PATENT DOCUMENTS

| | | |
|---|---|---|
| DE | 19741730 A1 | 4/1999 |
| DE | 19741731 A1 | 4/1999 |
| EP | 0 501 639 A2 | 9/1992 |
| EP | 0 374 799 B1 | 3/1995 |
| EP | 0 851 208 A1 | 7/1998 |
| EP | 0 690 287 B1 | 4/2001 |

* cited by examiner

Primary Examiner—Gene O. Crawford
(74) Attorney, Agent, or Firm—Townsend and Townsend and Crew, LLP

(57) ABSTRACT

A method of locating articles on a carrier plane on the basis of data obtained by a relative movement extending in a transport direction parallel to the carrier plane between a scanning plane and the articles and by repeatedly carrying out a total scan of the position of points on the articles and which include information on the position of the article points detected in the scanning plane, and on the basis of information on the relative position of the scanning plane and the articles in the direction of transport during a total scan. The method repeatedly reads the data on the position of the article points on the articles in the scanning plane and detects information on the relative position of the scanning plane and articles in the transport direction for a current total scan. The positions and extents of flanks of the articles, which substantially form a right angle with the carrier plane, are determined from the data of the current total scan. The positions and lengths of edges of the articles parallel to the carrier plane are determined on the basis of the positions and extents of the flanks as well as the information on the relative position of the scanning plane and the articles in the transport direction in the current total scan and in preceding total scans. Objects corresponding to articles are defined from the positions and lengths of the edges parallel to the carrier plane.

26 Claims, 8 Drawing Sheets

METHOD FOR LOCATING ARTICLES ON A SUPPORT PLANE

BACKGROUND OF THE INVENTION

The present invention relates to a method of locating articles on a support plane on the basis of data which reproduce the location of points on the articles, to a method of detecting articles on a support plane and to an apparatus for the carrying out of the method.

In many cases, it is necessary, on the automatic transport of articles, to be able to distinguish articles of a certain type of shape automatically from one another. This is in particular important if two or more individual articles are touching and there is a risk that this article group is evaluated as a single article.

It is thus necessary, for example on the automatic transport of packages, to recognize packages disposed on a conveyor belt automatically and to separate them from one another reliably on recognition.

It can furthermore be sensible to be able to determine their dimensions or their volumes automatically.

Since in many applications only articles of a certain type of shape occur, it is often sufficient only to be able to distinguish articles of a certain type of shape, i.e. to ensure recognition only within the respective type of shape.

Types of shape are of particular importance here in which the article has a base surface of a predetermined type of surface shape, a top surface substantially parallel to the base surface and one or more side surfaces extending substantially perpendicular to the base surface. Depending on the kind of the type of surface shape, these include, for example, articles of right parallelepiped shape with a rectangular base surface and cylindrical articles with a circular base surface.

SUMMARY OF THE INVENTION

An object underlying the invention is to provide methods with which articles of a certain type of shape can be located or articles of a certain type of shape arranged on a support plane can be detected on the basis of data on the location of points on surfaces of articles arranged next to one another and to provide a corresponding apparatus. The invention should in particular be usable for articles with a base surface of a predetermined type of surface shape, a top surface substantially parallel to the base surface and one or more side surfaces extending substantially orthogonally to the base surface, in particular articles of right parallelepiped shape.

With the method in accordance with the invention of locating articles having a base surface of a predetermined type of surface shape, a top surface substantially parallel to the base surface and one or more side surfaces extending substantially orthogonally to the base surface, in particular articles of right parallelepiped shape, on a support plane, on the basis of data which were obtained by a relative movement extending in a transport direction parallel to the support plane between a scanning plane, which includes a predetermined angle with the support plane, and the articles and by a repeated carrying out of a total scan of the location of the points on the articles within a detection range in the scanning plane, and which include information on the location of the article points detected in the scanning plane, as well as on the basis of information from which the relative position of the scanning plane and the articles in the transport direction can be derived during a total scan, the method comprises the repeated performing of the steps of: reading of the data on the location of the points on the articles in the scanning plane and detection of information on the relative position of the scanning plane and the articles in the transport direction for a current total scan, determination of positions and extents of flanks of the articles which form a substantially right angle with the support plane from the data of the current total scan, determination of positions and lengths of edges of the articles substantially parallel to the support plane on the basis of the positions and extents of the flanks and on the information on the relative position of the scanning plane and the articles in the transport direction in the current total scan and in preceding total scans and defining of objects corresponding to articles from the positions and lengths of the edges parallel to the support plane.

With the method in accordance with the invention of detecting articles having a base surface of a predetermined type of surface shape, a top surface substantially parallel to the base surface and one or more side surfaces extending substantially orthogonally parallel to the base surface, in particular of articles of right parallelepiped shape, on a support plane, a scanning plane, which substantially includes a predetermined angle with the support plane, and the articles are moved relative to one another in a transport direction parallel to the support plane, with a total scan of a detection region in the scanning plane being carried out repeatedly, in which data are detected on the location of points on the articles in the scanning plane, as well as information from which the relative position of the scanning plane and the articles in the transport direction can be derived during a total scan, and the location method is carried out in accordance with the invention on the basis of the data gained.

The apparatus in accordance with the invention for the detection of articles having a base surface of a predetermined type of surface shape, a top surface substantially parallel to the base surface and one or more side surfaces extending substantially orthogonally to the base surface, in particular of articles of a right parallelepiped shape, on a support plane, comprises at least one sensor for electromagnetic radiation with which data can be obtained with repeated total scans with respect to the location of points on the articles in a detection region in a scanning plane of the sensor, a device with which the articles and the sensor can be moved relative to one another in a transport direction parallel to the support plane, with the scanning plane of the sensor including a predetermined angle with the support plane, and a data processing device which is adapted for carrying out the location method in accordance with the invention. The detection method in accordance with the invention can be carried out with the apparatus in accordance with the invention.

The invention relates to articles of a predetermined type of shape whose general properties are used to locate the articles. Generally, the methods in accordance with the invention can be used for articles which have a base surface of a predetermined type of surface shape, a top surface substantially parallel to the base surface and one or more side surfaces extending substantially orthogonally to the base surface, for which reason the top surface must have substantially the same shape and extent as the base surface, which thus more or less represents a plan view of the article.

In this connection, the base surface must have a predetermined type of surface shape. This can, for example, be a quadrangle with any desired edge lengths and angles, and preferably also a rectangle with any desired edge lengths, so that in the latter case the articles have a right parallelepiped shape.

The base surface can furthermore be elliptical, for example, and preferably circular. In the latter case, articles with a cylinder shape result.

The articles are arranged on a support plane for the carrying out of the detection method in accordance with the invention or for the detection of the data for the location method in accordance with the invention, with the base surface being in contact with the support plane.

For the provision of data on the location of points on the articles, data are detected in the scanning plane in successive total scans of a detection region on the location of points on the articles within the detection region, which contain information on the location of the detected points on the articles in the scanning plane, i.e. two-dimensional location data in the scanning plane. A point on the article also called article point is here understood to be a region on the article which was scanned. This region can have an extent, for example on scanning with a laser beam, determined by the diameter of the laser beam.

A sensor for electromagnetic radiation, in particular infrared or visible light, is provided with the apparatus in accordance with the invention for the acquisition of these data, and corresponding data of articles in a detection region of the sensor can be acquired with this. The acquired data can in particular include a distance of an article from the sensor.

So as not to cover only a single section of an article, the article and the scanning plane are moved relative to one another in a transport direction parallel to the support plane for the data detection so that three-dimensional location data can be acquired by successive total scans. For this purpose, the apparatus in accordance with the invention has a corresponding transport device.

To actually obtain three-dimensional location data, the scanning plane here includes a predetermined angle with the support plane which must not be zero, since otherwise no data are available on the extent of the articles in a direction orthogonal to the support plane.

To determine the location of the scanning plane relative to the articles in the transport direction and thus parallel to the support plane during a total scan, information is acquired from which the relative position of the scanning plane and articles in the transport direction can be derived during a total scan. This can be a time stamp of the sensor, on the one hand, with which the sensor furnishes the data of a total scan, and a preferably constant speed of the relative movement of the scanning plane and the articles. It is, however, also possible for the transport device, for example, to transmit signals on the path covered within a certain period of time which can be used to determine the relative position in the transport direction. Signals of an incremental transducer of an element moving the sensor and/or the articles, for example a motor, can in particular be used so that the methods can also be carried out with a non-uniform relative movement.

The data acquired are used to carry out the location method in accordance with the invention which is carried out with the apparatus in accordance with the invention in a data processing device which can in particular include interfaces for the data input and data output, a memory to store data and an evaluation program and a processor connected to or communicating with the interfaces and the memory.

After the reading of the data, which can take place in each case after the acquisition of the same, the positions and extents of flanks of the articles in the actual total scan are determined from the data of the actual total scan. The flanks, which substantially form a right angle with the support plane, here correspond to the side surfaces of the article. The positions and extents of the flanks can in this connection in particular be defined by the positions of end points of the flanks.

Due to the shape of the articles, the flanks determined therefore end on the support plane or at the top surface of at least one article. If two articles of different extent directly adjoin one another in a direction orthogonal to the support plane, one flank can end at the top surface of the shallower article and at the top surface of the higher article.

Edges of the articles are now defined from the flanks in a series of total scans, said edges extending substantially parallel to the support plane due to the shape of the articles and, in simplified terms, more or less representing parts of a plan view of the articles. These edges are characterized, due to the shape of the articles, in that, among other things, the end points which make them up substantially have the same distance from the support plane.

By an analysis of the edges parallel to the support plane with respect to the type of surface shape and, depending on the type of surface shape, by an association of edges to one another, plan views of (virtual) objects corresponding to (real) articles are then more or less determined. In this connection, the fact can expediently be utilized that the edges parallel to the support plane, as a result of the shape of the articles, bound the base surface or top surface substantially parallel to the support plane. The edges to be associated with an article therefore have substantially the same distance from the support plane.

Furthermore, the type of surface shape can be used for the article location. For instance, for cylindrical articles, circular edges must be looked for, whereas with parallelepiped articles, rectangles must be looked for.

Touching articles can therefore also be located with the invention.

Furthermore, the dimensions of the articles can be determined, since their outline is known and the edges in which the flanks end bound the top surfaces and simultaneously specify the distance of the top surfaces from the support plane.

After the location of the articles, their positions and dimensions can be output, for example on output units or on apparatuses which serve for the further handling or processing of the articles.

The methods in accordance with the invention can be carried out particularly easily and quickly by the use of the special properties of the basic type of bodies to be located. The location of articles can in particular take place in real time.

It is therefore in particular suitable for the detection of, for example, articles of right parallelepiped shape such as packages on conveyor belts in distribution centers of logistics companies.

The scanning plane can generally include any desired angle with the support plane and also with the transport direction—with the exception of the restriction stated above. However, to determine the flanks, expedient transformations of the location coordinates of points in the scanning plane into such location coordinates in which a determination of the flanks is simple must then be carried out. Since the side surfaces forming the basis for the flanks extend substantially orthogonally to the support plane, corresponding transformations are then necessary. With the location method in accordance with the invention, it is therefore preferred for data to be used which were obtained while using a scanning plane orthogonal to the support plane. The transport direction is particularly preferably aligned orthogonally to a sectional line between the support plane and the scanning plane since this simplifies the edge recognition. With the detection method in accordance with the invention or with the apparatus in accordance with the invention, it is preferred for the scanning plane to be aligned orthogonally to the support plane, and particularly preferably also the transport direction. The method can thereby be carried out substantially more simply and thus more quickly.

Since the sensor only detects the data in the scanning plane with an error caused by the sensor and by differences of the articles from the ideal shape, undesirably large fluctuations can occur in the location data especially in the region of the side surfaces or flanks. It is therefore preferred with the methods in accordance with the invention for the data to be subjected to a spatial filtering with respect to a direction orthogonal to the support plane before the determining of the flanks. For this purpose, a median filter, or also a moving average determination, can be used, for example.

To be able to recognize the flanks particularly precisely, and simultaneously in a simple manner, it is preferred with the methods in accordance with the invention for respective magnitudes of distances of successive data points in a direction orthogonal to the support plane to be used for the recognition of the flanks. In particular, corresponding gradient filters can be used for this purpose. For example, a flank can be determined when the magnitudes of the distances exceed a predetermined threshold whose value can be selected in dependence on the spatial resolution of the sensor and on expected minimal and maximal dimensions of the articles in the direction orthogonal to the support plane. In this connection, the data points are detected in a sequence which corresponds to a progressive scan in the scanning plane transversely to the support plane.

The accuracy of the determination of the location of edges parallel to the support plane can in particular depend on the accuracy of the determining of the position of the end points of a flank. It is therefore preferred that positions of end points of the flanks in a direction parallel to an intersection line of support plane and scanning plane are obtained in each case by averaging corresponding data of data points associated with the flank. Fluctuation errors are largely compensated by the averaging of a plurality of data points.

It is furthermore preferred for the same purpose for a distance from the support plane or a value of a coordinate in a direction orthogonal to the support plane to be associated with an end point of a flank which are obtained by averaging of corresponding data of data points of a surface of a detected article adjacent to the flank at the end point and substantially orthogonal to the flank.

Due to the shape of the articles, a surface of an article parallel to the support plane always adjoins an end point of a flank. To be able to use this information in forming the object, it is preferred for a direction to be associated with an end point of a flank which indicates in which direction a surface of a detected article extends which adjoins the flank and is substantially orthogonal to this flank. Edges of articles of right parallelepiped shape parallel to the support plane can thus be located very easily since these are formed by end points of flanks with which the same direction is associated.

For the determination of the edges parallel to the support plane, the locations of the end points of the flanks in the transport direction must be known. It is preferred for the fast and simple determination of the location of the end points for the positions of end points of the flanks of a total scan in the transport direction of the articles to be determined on the basis of the movement speed between the scanning plane and the articles and the time interval of the total scan from the current total scan.

It is preferred for the fast determination of the edges parallel to the support plane for the positions of end points of the flanks and the directions associated with the end points to be used. The association of end points to edges is thus made substantially simpler.

It is preferred with the methods in accordance with the invention for them to be used for the location of articles of right parallelepiped shape and for a new object to be generated only when two edges substantially parallel to the support plane are found which have approximately the same distance from the support plane and include an angle whose magnitude is smaller than a predetermined limiting angle. This means that a search is made for edges which are substantially parallel to one another, are parallel to the support plane and border a right parallelepiped. This method can be carried out particularly simply and precisely. Further criteria can be used to accelerate the search.

It is furthermore preferred for the methods in accordance with the invention to be used for locating articles of a right parallelepiped shape and for a new object only to be generated when a different direction is associated with the end points, which are used as the basis of the one edge parallel to the support plane, than with the end points which are used as the basis for the other edge parallel to the support plane. This very simple, but effective criterion for the object finding again utilizes the shape of the articles since two oppositely disposed side areas of a parallelepiped merge on respectively oppositely disposed sides into the top surface.

The methods in accordance with the invention simply make available the positions of the edges parallel to the support plane both in the support plane, and thus a base surface of the article, and in a direction orthogonal to the support plane. It is therefore preferred for the volume of at least one article to be calculated on the basis of a base surface, which is defined by edges of the object parallel to the support plane, and of the distance of the edges parallel to the support plane from the support plane. The volume of the object then corresponds in a good approximation to the volume of the corresponding article. Such a method also not only makes possible the detection or location of articles, but simultaneously allows the determination of their volumes. It is therefore particularly suitable for use in the transport and logistics industries.

It is preferred for the data on the location of article points to be detected by means of a laser measuring device which has an areal detection area. Such devices work with high accuracy in a contact-free manner and are additionally service friendly.

A laser measuring device is particularly preferably used which includes at least one laser scanner, preferably a radial scanner. Such laser scanners allow a fast and precise detection of the locations of surface regions on articles. Line scanners arranged above the support plane with stationary scanning radiation beams relative to the line scanner or laser scanners with moving scanning radiation beams can, for example, be used as the laser scanners. In this connection, in particular radial scanners have a large detection region in the shape of a sector of a circle.

To avoid a covering of an article by another, it is preferred for at least two laser scanners arranged along a line orthogonal to the transport direction of the articles and above the support plane, in particular radial scanners, to be used whose detection regions overlap. With the apparatus in accordance with the invention, it is preferred for this purpose for two laser scanners to be provided whose scanning planes are inclined at a predetermined angle to the support plane and which are arranged at a predetermined distance away from this and at both sides of a possible trajectory of the articles. Their scanning planes are particularly preferably also aligned orthogonally to the transport direction.

With the method in accordance with the invention, the scanning plane, i.e. the sensor of the apparatus in accordance with the invention, can generally be moved. However, due to the then movable connectors required for the sensor, an apparatus for the carrying out of the detection method in accordance with the invention becomes complex and defect prone. It is therefore preferred that, with the detection method in accordance with the invention, the articles are moved with a scanning plane arranged in a stationary manner. With the apparatus in accordance with the invention, it is preferred for the device for the relative movement to be a conveyor device for the articles. Due to the fixed installation of the sensor, in particular its adjustment is simplified or its de-adjustment is avoided.

A further subject of the invention is a computer program comprising program code means to carry out the location method in accordance with the invention when the program is run on a computer.

Finally, a computer program product is a subject of the invention comprising program code means which are stored on a computer readable data carrier to carry out the location method in accordance with the invention when the computer program product is run on a computer, i.e. a data processing unit.

The invention will now be explained further by way of example with reference to the drawings.

DESCRIPTION OF THE PREFERRED EMBODIMENTS

Figure 1:
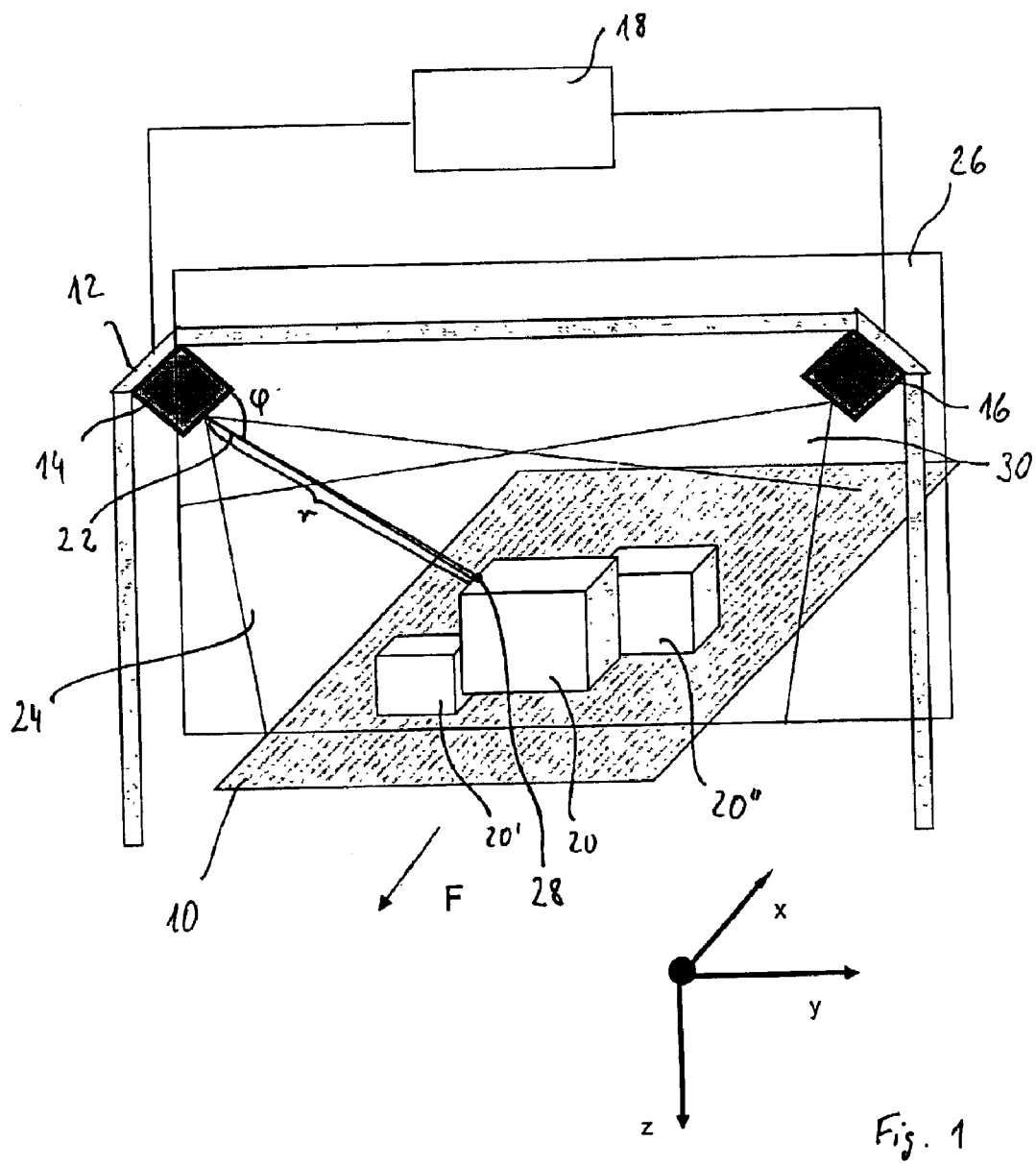
FIG. 1 is a schematic perspective view of a conveyor belt with articles and an apparatus for the detection of the articles.

In FIG. 1, a conveyor belt 10 is arranged in the detection region of two laser scanners 14 and 16 positioned to the right and to the left above the conveyor belt 10 at a bridge 12. The laser scanners 14 and 16 are connected to an evaluation device 18.

The conveyor belt 10 forms a support plane in the region of the laser scanners 14 and 16 and is driven by a drive device not shown in FIG. 1 at a constant speed for the transport of articles 20, 20', 20" in a transport direction F.

In a Cartesian coordinate system with the axes X, Y and Z, which is moved along with the conveyor belt 10, the support plane is arranged parallel to the X/Y plane of the coordinate system. The transport direction F is aligned parallel to the X axis, but oriented in the opposite direction.

The laser scanners 14 and 16 are in each case conventional radial scanners whose function will be described briefly by use of the laser scanner 14 as an example.

With the laser scanner 14, as is shown in FIG. 1, a radiation bundle 22 of a laser is pivoted with a constant angular velocity in a planar detection region 24 in a scanning plane 26 such that the detection region 24 is swept over with a constant scanning frequency. Synchronously to this, a receiver for reflected radiation of the laser is pivoted along by means of which radiation of the radiation bundle 22 transmitted at a specified angle $\phi$ and reflected at a region 28 of the article 20 can be detected at this angle. The detection of reflected light takes place at constant time intervals so that data are taken at constant angular intervals.

In this manner, data on the position of articles 20 disposed in the detection region 24 can be detected in the scanning plane 26. If, at a specified rotational angle $\phi$, the radiation bundle 22 transmitted by the laser scanner 14 is reflected by the point or region 28 of the article 20 and received by the receiver of the laser scanner 14, a distance r of the region or of the point 28 from the laser scanner 14 is determined at the specified rotational angle $\phi$ from the run time of the radiation bundle 22 between the laser scanner 14, the region 28 of the article 20 and again the laser scanner 14.

The laser scanner 14 outputs a distance r at which an article point 28 on the article was detected as the data for every angle $\phi$. If an article point is disposed outside the detection region in the radial direction or if no article point was found, a corresponding distance value is output with a predetermined very large value.

The detection regions 24 and 30 of the laser scanners 14 and 16 respectively are aligned perpendicular to the transport direction F and thus parallel to one another. Furthermore, the detection regions 24 and 30 overlap such that article points in the overlapping region of the detection regions of the laser scanners 14 and 16 can be detected by both laser scanners 14 and 16.

To be able to combine the data of the laser scanners 14 and 16 to one total scan in an advantageous manner, the laser scanners 14 and 16 work with the same scanning frequency and a phase shift of 180°.

The evaluation device 18 has—not shown in FIG. 1—interfaces for the inputting of data from the laser scanners 14 and 16, a memory device for the storage of data and of an evaluation program, an output interface and a processor connected to the input interfaces, the memory device and the output interface.

Figure 2:
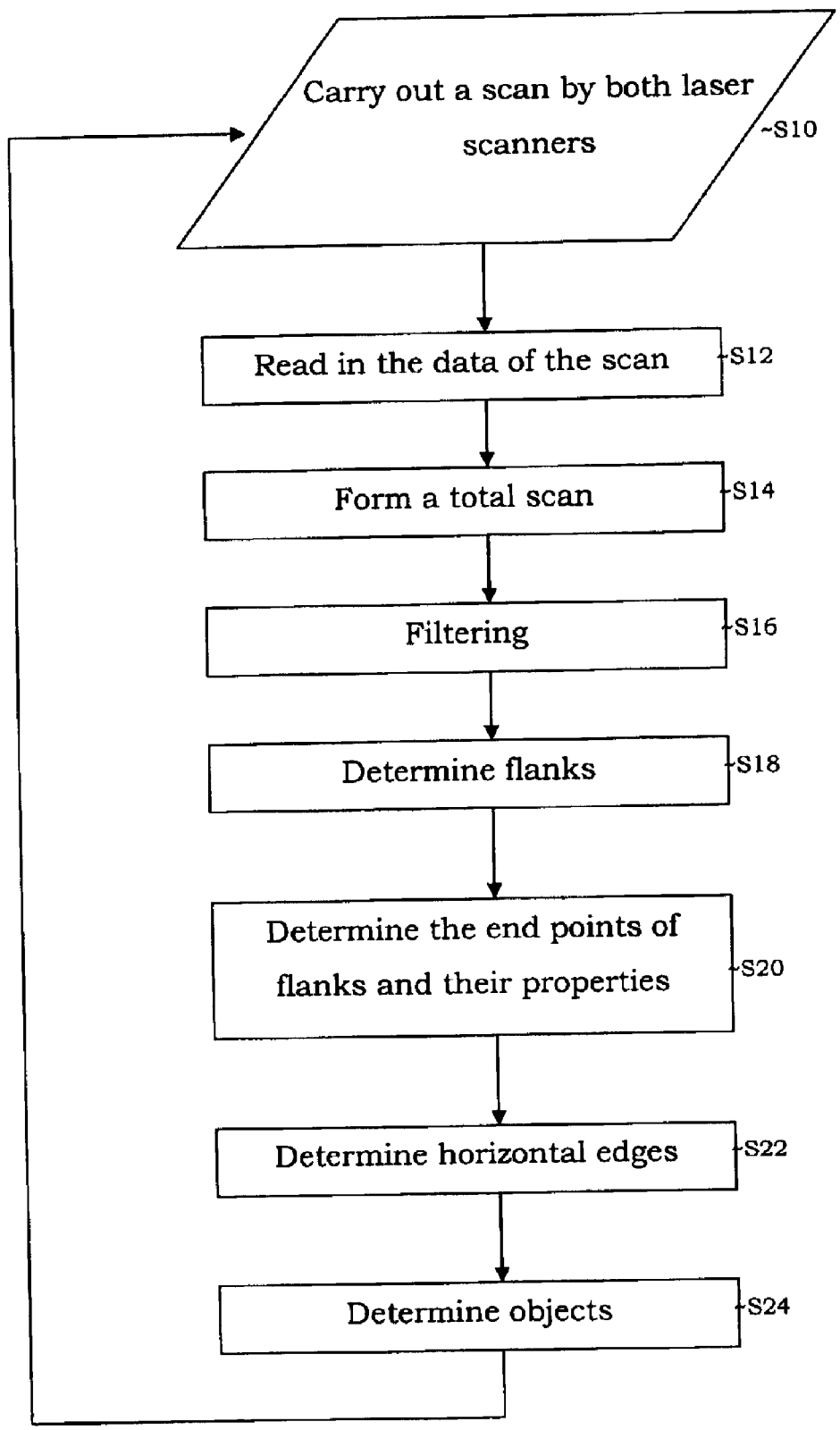
FIG. 2 is a flowchart in which the main steps of a method used by the apparatus in FIG. 1 are illustrated.

To locate articles on the conveyor belt 10, the following process is carried out cyclically with the scanning frequency, with the following procedures each taking place in one cycle:

Successive single scans are carried out by the laser scanners 14 and 16 in a step S10 (cf. FIG. 2) in each case according to the scanning frequency. Since the scans of the laser scanner 14 are offset by half a scanning period T/2 with respect to those of the laser scanner 16, scans i are detected at times $t_i^{(14)}$ of the laser scanner 14 with data points $(r_j^{(14)}, \phi_j^{(14)})_i$, where j=1, N, and scans of the laser scanner 16 are detected at times $t_i^{(16)} = t_i^{(14)} + T/2$ with data points $(r_j^{(16)}, \phi_j^{(16)})_i$, where N is the number of rotational angle positions in a scan i of the detection region 24 or 30 respectively by the laser scanner 14 or 16 respectively, i is in each case a natural number and $r_j^{(14)}$ or $r_j^{(16)}$ respectively are the distances of a detected article point, i.e. point on the article, from the laser scanner 14 or 16 which were detected at the detection angles $\phi_j^{(14)}$ or $\phi_j^{(16)}$ with respect to the Z axis.

Although the individual data points of a scan are detected successively, due to the low speed of the conveyor belt 10 compared with the scanning frequency, the same detection time can be associated with all data points of a scan in very good approximation. This detection time results from a time stamp output with the data points by the laser scanners 14 and 16. On the basis of this time stamp and the transport speed, the x coordinates of the scanning plane 26, and also of the article points detected in the current scan in the scanning plane 26, are thus also defined in the coordinate system, which is moved along.

The actual evaluation process, which is carried out by means of the processor in the evaluation device 18, includes the following routines:

After reading the data points and the time stamp from the laser scanners 14 and 16 into the evaluation device 18 in step S12, the data points of the two scans are combined into one total scan in step S14.

For this purpose, the data points of a scan i are converted by means of known relationships into the corresponding Cartesian coordinates $(y_j^{(14)}, z_j^{(14)})_i$ or $(y_j^{(16)}, z_j^{(16)})_i$ in the coordinate system moved along with the conveyor belt 10. In this connection, a height contour z results as a function of the position y along the Y axis. Such height contours are shown by way of example in FIGS. 3a and 3b for data of the laser scanners 14 and 16, with the origin of the coordinate system being selected at any arbitrary, but fixed, point. It must be observed in this connection that, in these illustrations, as also in corresponding later illustrations, the position of the conveyor belt in the illustration would be at the top since the Z axis in FIG. 1 points downward. Furthermore, in these illustrations, scales are drawn on the axes in predetermined, but arbitrary units. Since the magnitude of the numbers is not important for the explanation of the method, the units are not explicitly set forth.

Furthermore, an x coordinate is calculated for each data point which results from the time $t_i^{(14)}$ or $t_i^{(16)}$ or the corresponding time stamps of the scan multiplied by the transport speed of the conveyor belt 10 and which specifies the position of the scanning plane or detection plane at the time of detection.

To achieve a higher resolution, a total scan is then formed in that a previous scan i of the laser scanner 14 at the time $t_i^{(14)}$ is combined with a later scan i of the laser scanner 16 at the time $t_i^{(16)} = t_i^{(14)} + T/2$.

The total scan is built up successively starting from the sequence of the data points of the previous scan of the laser scanner 14 in its original order. At the start, the total scan therefore consists of the sequence of the previously detected data points in their original order.

Starting with the first data point of the later scan of the laser scanner 16, a respective data point of the later scan is then inserted into the current total scan in the order of the data points in the previous scan at a position at which the previous data point of the current total scan has a smaller y coordinate than the data point to be inserted and the following data point, if present, has a larger y coordinate than the data point to be inserted. A new current total scan arises by the insertion with which the insertion process is continued until all data points of the later scan are inserted.

Figure 3A:
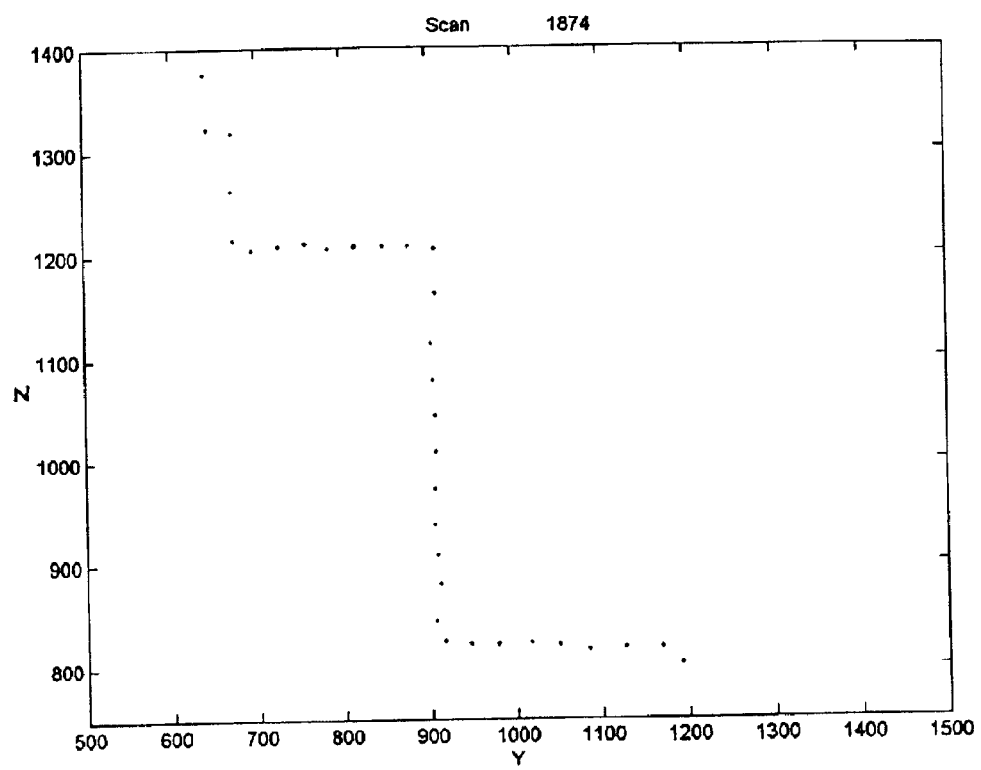
FIGS. 3a, b are two schematic diagrams in which the location of points on articles detected in each case by one of the laser scanners in FIG. 1 in a Y/Z plane is illustrated.
Figure 3B:
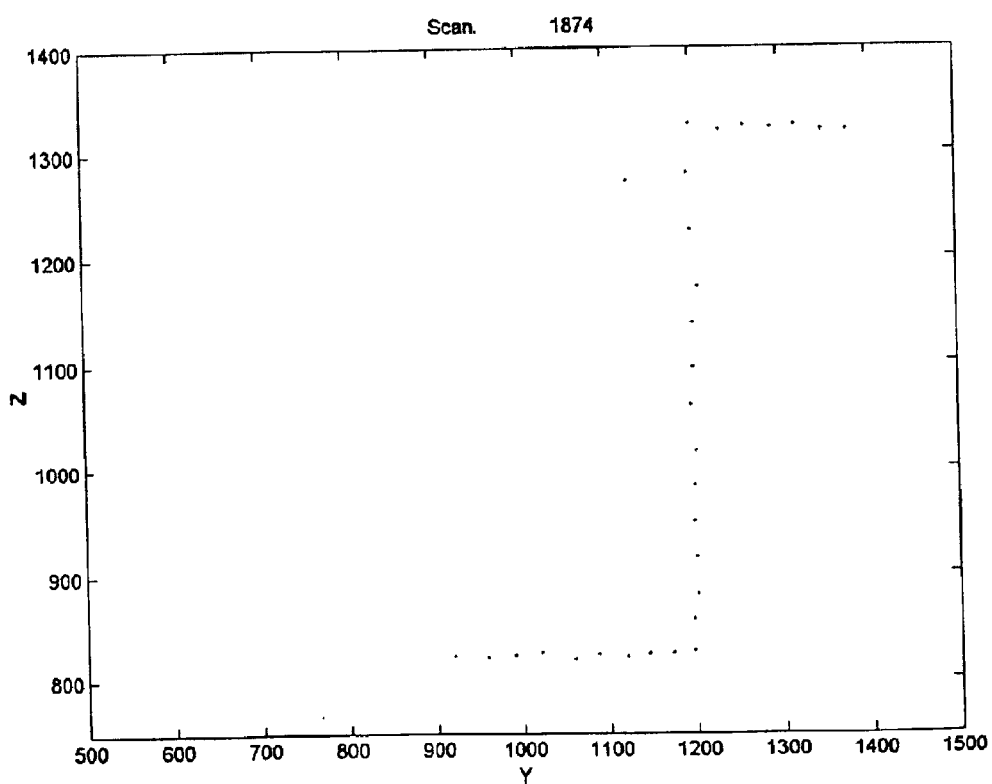
Figure 4:
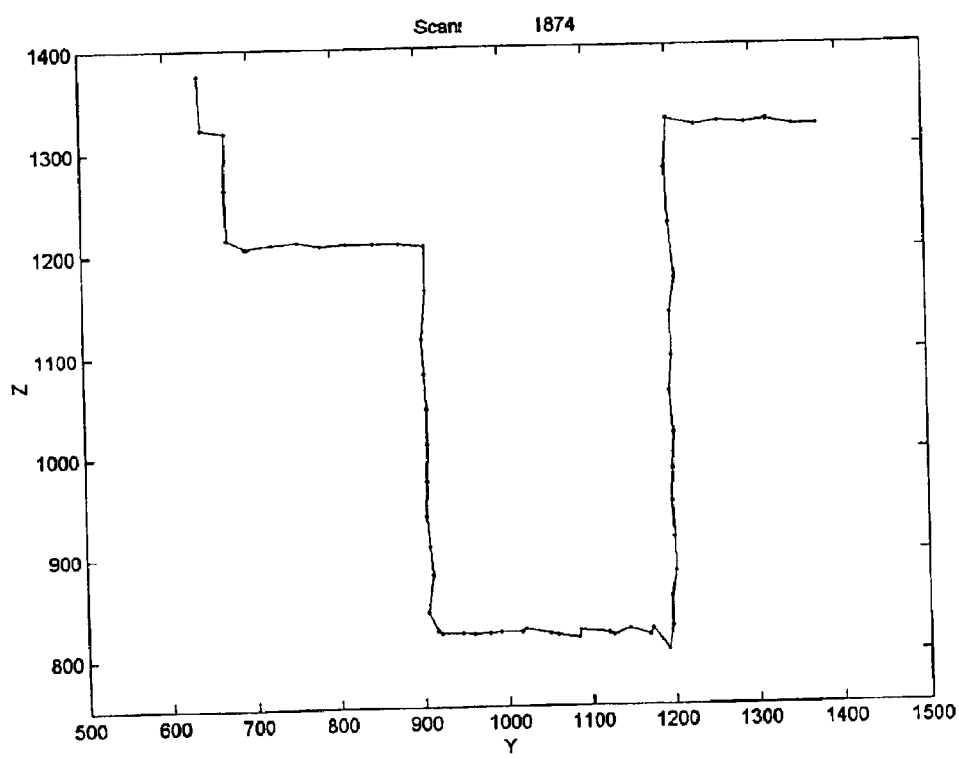
FIG. 4 is a schematic diagram in which the data in FIGS. 3a, b are illustrated after a merging.

The total scan now has data points $(x_j, y_j, z_j)$ for j=1, 2N and now no longer has, as shown in FIG. 4, any hidden area which was still present in the individual scans (cf FIGS. 3a and 3b).

In a following step S16, the z coordinates of the data points of the total scan are then subjected to a filtering with a median filter in which three successive values are respectively considered. A z coordinate of a central data point of three successive data points in the sequence of the data points of the total scan is here replaced by the z coordinate of the three data points which is neither the smallest nor the largest of the three z coordinates. The result of the filtering is shown by way of example in FIG. 5. The solid line connects the filtered data points, while the individual points show the unfiltered data points.

Figure 6:
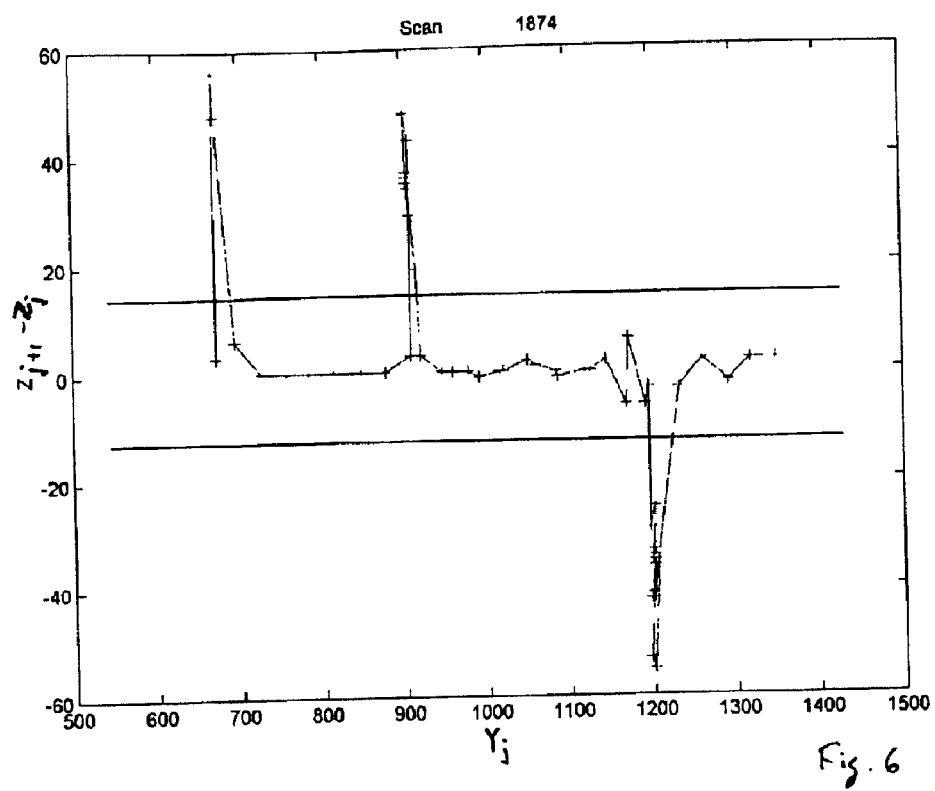
FIG. 6 is a schematic diagram in which the height differences associated with the data points in FIG. 5 are shown as a function of the y coordinate of the data points.

In a next step S18, the position of flanks, which are substantially perpendicular to the support plane, i.e. define an angle with the Z axis within a predetermined small angular range, is determined in the current scan. For this purpose, differences of the z coordinates of successive filtered data points of the total scan termed height differences in the following are calculated and associated with the data points. In FIG. 6, the differences of the z coordinates $z_{j+1} - z_j$ of successive filtered data points j=1, 2N−1 are depicted as a function of the corresponding y coordinates $y_{j+1}$.

If the magnitude of the height differences exceeds a predetermined threshold which is indicated in FIG. 6 by horizontal straight lines and which increases as the width of the angular range decreases, a flank is determined at the corresponding y coordinate or at the corresponding data point which is now considered as the data point defining the position of the flank, with the threshold being determined experimentally by optimization experiments.

As shown in FIG. 6, in this connection, also a plurality of successive magnitudes of the height differences can exceed the threshold. The provisional position of the flank is then defined by the data point whose height difference exceeds the threshold the most.

Figure 5:
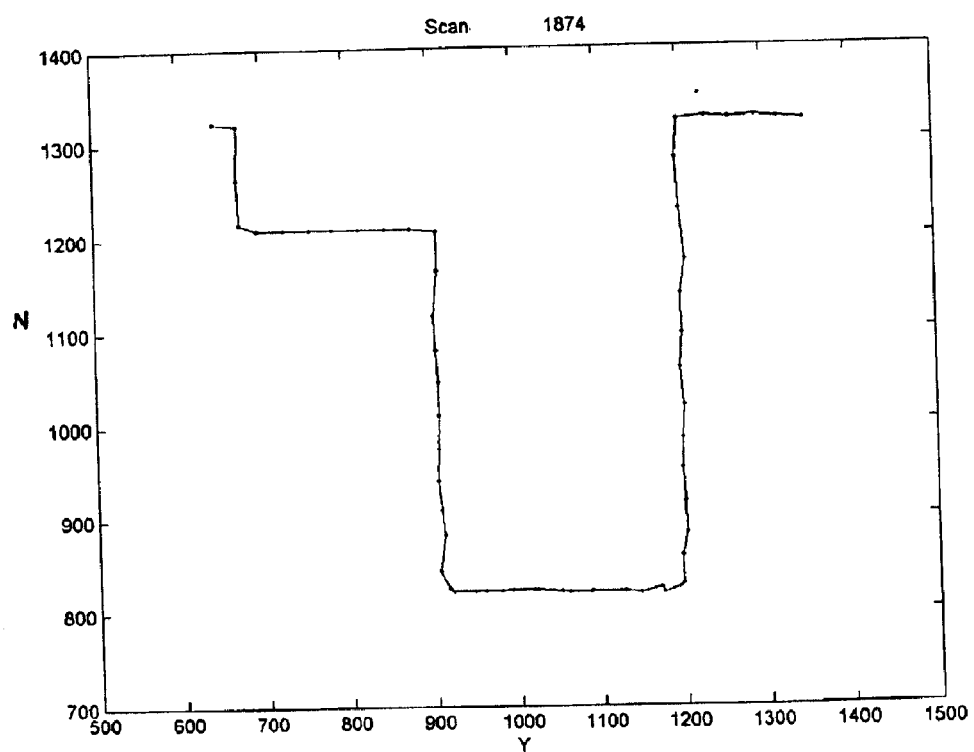
FIG. 5 is a schematic diagram in which the data of FIG. 4 are shown after a filtering.
Figure 7:
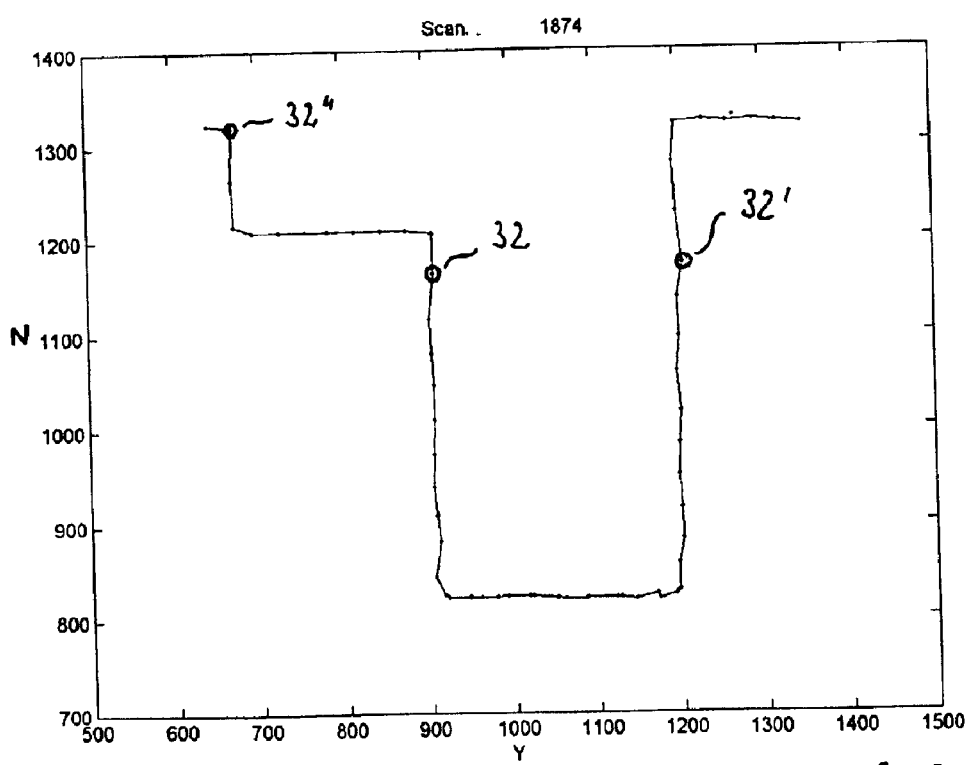
FIG. 7 is the schematic diagram of FIG. 5 in which the provisional positions of data points defining flanks are depicted.

The defining data points 32, 32' and 32" for the data from FIG. 5 are illustrated by circles in FIG. 7.

Figure 8:
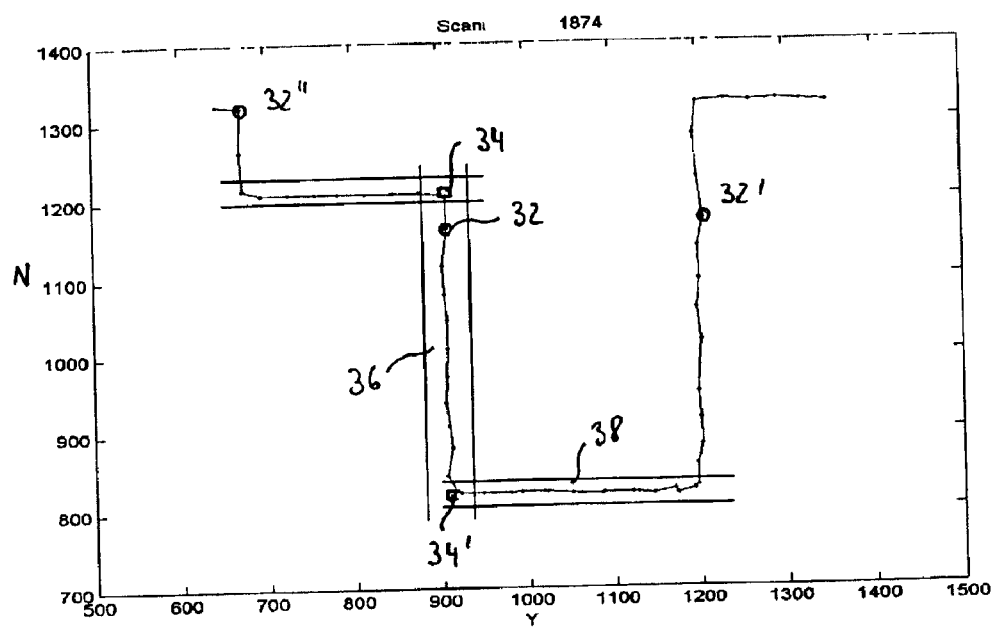
FIG. 8 is the schematic diagram of FIG. 5 in which search regions for the computation of end points of a flank are drawn.

In a following step S20, the length and exact position of the flanks found in the preceding step are then determined in that the position of end points of the flanks is determined. The following procedure is carried out for this purpose for each flank found (cf. FIG. 8):

Starting from the determined data point which defines the provisional position of the flank, data points are looked for which succeed one another both in the direction of smaller and larger y values and whose y coordinate lies within a searching interval 36 of predetermined width which is represented by vertical lines in FIG. 8 and at whose center the value for the y coordinate of the data point defining the position of the flank lies and which have a height difference which has the same sign as the height difference which defines the flank. The width of the search interval 36 depends on the spatial resolution of the laser scanners 14 and 16 and on the expected dimensions of the articles 20, 20' and 20" and is preferably determined by optimization experiments.

If either no further data point is found in the search interval 36 or if a data point occurs with a height difference with a sign which differs from the sign of the height difference which defines the flank, the search in the corresponding direction is aborted.

The mean value of the y coordinates of all data points found is used as the y coordinate of the end points of the flank.

Starting from the data points found above with maximal and minimal z coordinates, the method is now repeated in a similar manner for adjoining regions which extend substantially horizontally, i.e. in the direction of the Y axis, since the flanks must merge into surfaces orthogonal to the flanks with articles of a right parallelepiped shape.

Starting at an initial data point from the set of the data points which form the flank whose z coordinate adopts an extreme value under the z coordinates of the data points in the set, successive data points are looked for in both a rising and a falling order in the total scan whose z coordinate lies within a search interval 38 of predetermined width which is indicated by horizontal lines in FIG. 8 and at whose center the determined provisional value for the z coordinate lies. As before, the width of the search interval 38 is selected in dependence on the spatial resolution of the laser scanners 14 and 16 and on the expected ranges of dimensions of the articles 20, 20' and 20".

If no further data point is found in a direction, the search is ended.

The set of the data points found then corresponds to a surface of the article orthogonal to the flank.

After the search has ended, the mean value of the z coordinates of the data points located is then used as the z coordinate of the corresponding end point.

Furthermore, the x coordinate of the data point defining the provisional position of the flank is used as the x coordinate of the end points of the flank.

Furthermore, an edge direction, which is termed a "left" and "right" edge direction in the example, is associated with an end point of a flank. This edge direction corresponds to the direction in which a surface of the article orthogonal to the flank adjoins the flank at the corresponding end point. For this purpose, a check is made as to whether more data points are found within the search interval for the z direction whose y coordinate has a respectively smaller value than the y coordinate of the end point or more data points whose y coordinate has a larger value. In the first case, "left" is associated with the end point as the edge direction; in the other case "right" is associated.

The results of the flank determination are therefore calculated end points with newly determined x, y and z coordinates and associated edge directions. These end points are represented by the circles 34 and 34' in FIG. 8.

As a result of the already known type of shape, namely the right parallelepiped shape, of the articles, the end points of the flanks in successive total scans must reproduce edges extending horizontally, i.e. in the X-Y plan, or, in the isolated cases, a corner of the article.

Figure 9:
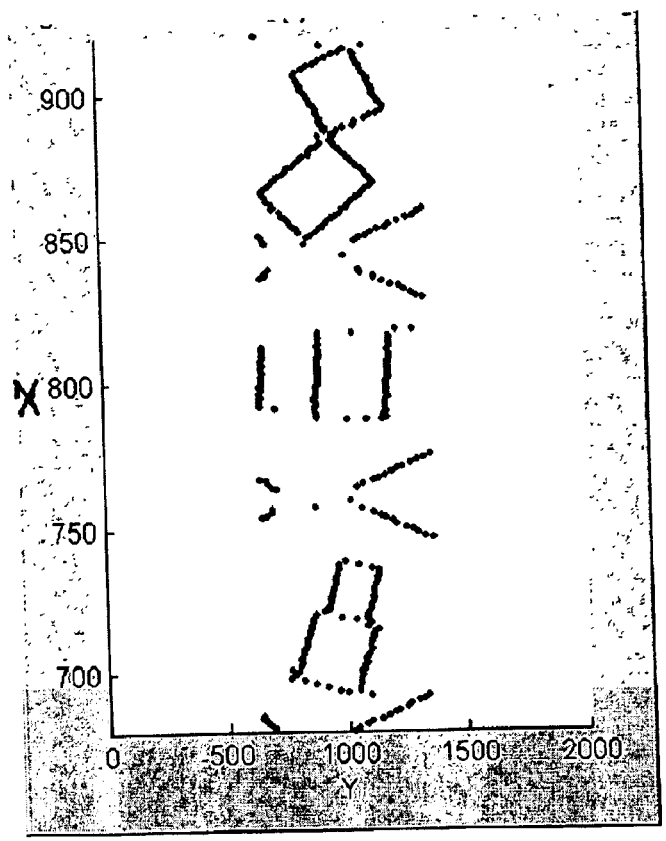
FIG. 9 is a schematic diagram in which projections of end points of found flanks into the X/Y plan are shown.

In a following step S22, edges parallel to the plane of the conveyor belt 10, which are termed horizontal edges in the following, are therefore determined from the data on the flanks, i.e. from their end points and the edge directions associated with these, in the current total scan and in a predetermined number of previous total scans. These horizontal edges reproduce, in a certain sense, an outline of the articles detected. Projections of found end points of flanks to the X-Y plan are shown in FIG. 9.

In this connection, it is assumed that a set of recognized provisional edges already exists for which the end points of the flanks which they consist of, including the edge directions associated with them, are stored in each case in corresponding edge buffers.

At the start of the process, the set of recognized provisional edges is empty. In later process stages, the following sub-steps are carried out for each provisional edge in the set of provisionally recognized edges:

Associated end points are looked for among the end points of a current total scan for a selected provisional edge.

For this purpose, all end points of the current total scan are checked as to whether the z coordinate for the respective end point differs by less than a predetermined maximal small amount from the z coordinate of the end point in the edge buffer with the largest x coordinate and as to whether a direction agreeing with the direction of the end points in the edge buffer is associated with the respective end point.

A check is only made for the end points which satisfy these two criteria as to whether these can also correspond to the provisional edge geometrically.

For this purpose, the fact is utilized that the type of surface shape of the base surface of the articles, that is a rectangle, and thus the shape of the edges, that is straight line sections, are known.

For this purpose, the end point is looked for in the edge buffer which has the largest value of the x coordinate, i.e. is the latest end point. With a corresponding arrangement of the end points in the edge buffer, this is the last end point.

Then a capture range is determined in which a search is made for end points from the current total scan. This capture range is fixed differently depending on the number of end points in the edge buffer:

If fewer than five points are located in the edge buffer, a search is made within a capture range in the y direction whose center lies on the value of the y coordinate of the end point with the largest x coordinate and which comprises a width of approximately four times that of the path covered by the conveyor belt 10 since the location of the last end point of the edge. This path can be determined as the difference of the maximum x coordinates of the current end points and the x coordinate in the edge buffer with the largest value of the x coordinate. This capture range corresponds approximately to a triangle opening in the X direction in the X, Y plane.

If at least five points are contained in the edge buffer, an approximated gradient of the edge in the X-Y plane is determined in that a sum of all differences of the y coordinates of successive end points in the edge buffer is divided by the sum of all differences of the x coordinates of successive end points in the edge buffer. The product of the approximated gradient and the path covered by the conveyor belt 10 since the last end point of the edge is added to the y coordinate of the end point with the largest x coordinate to obtain an expected value of the y coordinate of the next end point to be looked for. Then a capture range is again defined in the y direction whose center is formed by the expected value of the y coordinate and whose total width comprises twice that of the path covered by the conveyor belt 10 during a scanning period.

A search is now made in these capture ranges in the y direction for end points in the actual total scan which have already satisfied the first two criteria.

If such an end point is found, the end point is taken into the edge buffer.

In the other case, a check is made of for how many total scans no new end point was taken into the edge buffer, i.e. over which distance in the X direction no further end point was found. If no further end points were found over a predetermined number of total scans which corresponds to a predetermined distance selected in dependence on the resolution of the laser scanners 14 and 16, on the transport speed and on a range of expected dimensions of the articles 20, 20' and 20", it is assumed that the edge is complete. The edge buffer is then closed and no longer used in the further edge search.

If an edge buffer contains fewer than a predetermined number of end points selected in dependence on the resolution and the expected range of dimensions of the articles, five in the example, the provisional edge and the edge buffer are discarded.

Thereupon, a check is made, by checking the mean square difference of the end points in the edge buffer from a regression straight line laid through these, as to whether the constructed edge is to be seen as a straight line. If this is not the case, the edge and the edge buffer are discarded.

Otherwise a starting point and an end point of the now complete edge are calculated in that the end point in the edge buffer with the lowest value of the x coordinate is projected onto the regression straight line by the end points in the edge buffer in a direction orthogonal to the regression straight line. The end point with the largest value of the x coordinate in the edge buffer is treated in the same manner. The projected points are considered as the end points of the edge with which in addition the mean value of the z coordinates of the end points is associated as the z coordinate and the direction of the end points as the direction.

The method is then continued with the next provisional edge.

After all provisional edges have been run through, the above sub-steps are again carried out in an analogous manner, but with the role of the X direction and of the Y direction being switched.

At the end of the edge formation, end points of the current scan can remain as not associated. It is then assumed that these end points each belong to a new edge and new edge buffers are opened in each case.

Figure 10:
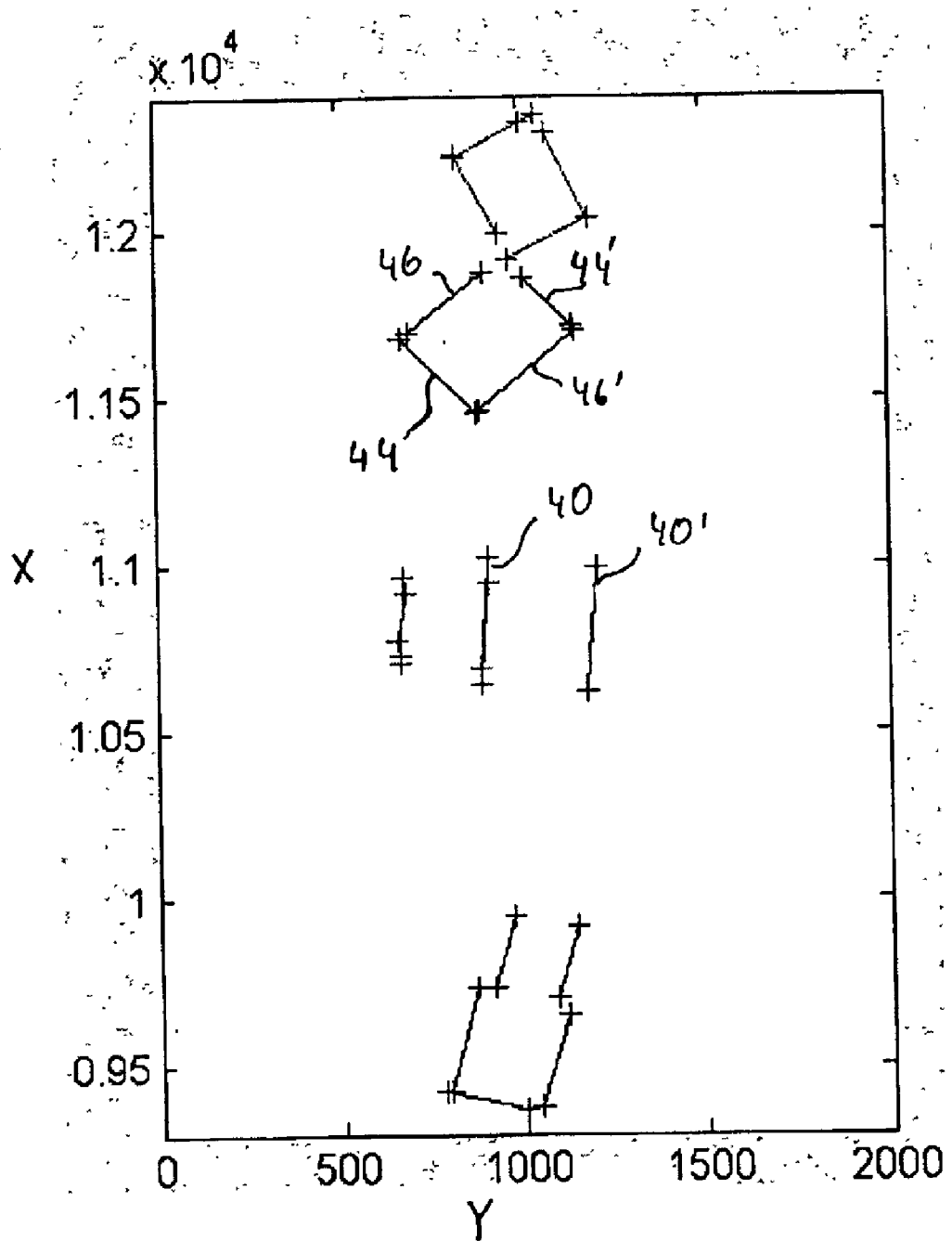
FIG. 10 is the schematic diagram of FIG. 9 after replacement of the projections of the end points by horizontal edges.

The results of the edge formation, starting from FIG. 9, are shown in FIG. 10.

In the following step S24, the object location is carried out on the basis of the horizontal edges determined as complete up to this time.

For this purpose, angles are first calculated which include the found horizontal edges with the X axis.

Then a first horizontal edge from the set of horizontal edges determined is set as the current edge. Further edges in the previously determined set of horizontal edges, which extend parallel to the current horizontal edge, are then looked for with respect to the current edge, for which purpose the previously determined angle with the X axis is used. Parallelism is recognized when the angles differ by less than a predetermined maximum value, in the example by approximately 2°.

Those edges are then selected from the edges which meet this criterion whose z coordinate differs from the z coordinate of the current horizontal edge by less than a predetermined maximal small z tolerance and with which a direction oppositely oriented to the direction of the current horizontal edge is associated.

If, after this check, even more parallel edges remain, that edge is selected as the edge belonging to the current edge which lies in the direction—starting from the current edge— which is specified by the direction associated with the current edge. This means, for example, that only an edge with a direction "left" is associated with a current edge having a direction "right" whose end points in the y direction lie to the right of the end points of the current edge, i.e. have larger y values. If a plurality of edges also meet this criterion, the edge with the lowest distance is selected.

With the method described, it is possible for edges to be calculated several times in the edge forming step. If an edge is found in the search for an edge which has a distance below a distance limiting value which is specified, among other things, by the minimal size of the articles to be found, and which amounts to less than 2 mm in the example, this edge is deleted as redundant and no longer used in the further process.

The horizontal current edge and the associated parallel horizontal edge are then characterized as belonging to one object and segregated from the set of horizontal edges.

In a following sub-step, edges orthogonal to the current horizontal edge are determined from the set of defined horizontal edges. In this connection, a check is made for each of the edges in the set as to whether a difference between its angle with the X axis and the angle of the current horizontal edge and the X axis modulo 180° lies within a predetermined error range of, in the example, approximately 3°. If this is the case, the horizontal edge is considered as orthogonal to the current horizontal edge.

Those edges are then selected from among the orthogonal edges whose z coordinate differs by less than a predetermined maximum small amount from the z coordinate of the current horizontal edge.

If, after this check, a plurality of edges orthogonal to the current horizontal edge are left, a check is made as to whether these connect the current horizontal edge and the associated parallel horizontal edge.

For this purpose, the respectively next distances of the end points of the orthogonal horizontal edges from the end points of the current horizontal edge and from the end points of the parallel horizontal edge are calculated. If these are smaller than an error value predetermined in dependence on the minimum dimensions of the articles, here approximately 50 mm, an orthogonal horizontal edge is recognized as belonging to the object and segregated from the set of horizontal edges.

Figure 11:
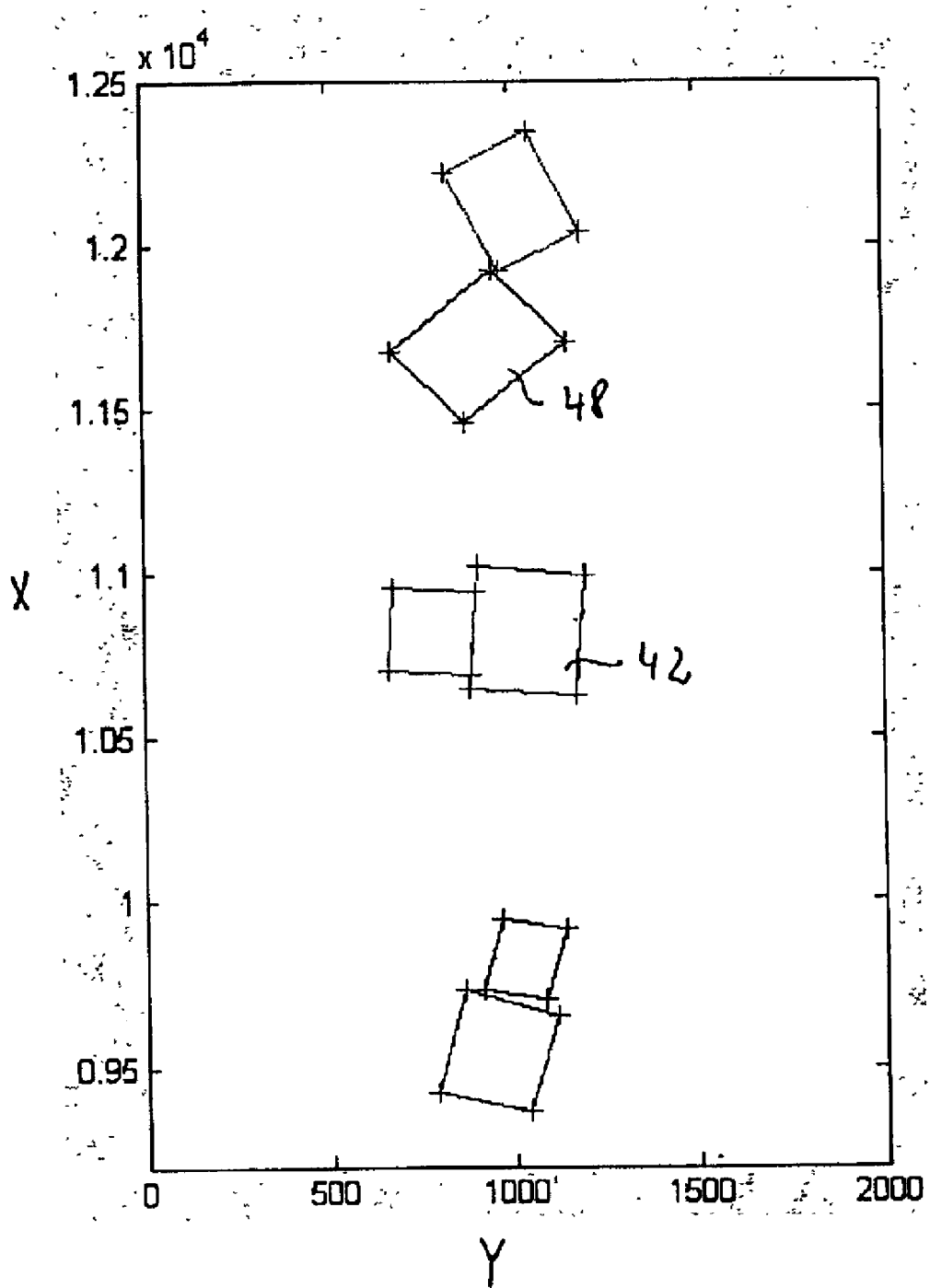
FIG. 11 is the schematic diagram of FIG. 10 after the construction of objects.

If no orthogonal horizontal edges were found, which can be the case, for example, when an article is aligned parallel to the X direction, the end points of the current horizontal edge 40 and of the parallel horizontal edge 40' are used as the corner points of the projection of the object 42 onto the X-Y plane (cf. FIGS. 10 and 11).

If orthogonal horizontal edges 44 and 44' were found for parallel horizontal edges 46 and 46', the points of intersection of the current edges and of the parallel horizontal edges, or their extension with those of the orthogonal horizontal edges, or their extension, are used as the corner points of the projection of the object into the X-Y plane.

The object is only recognized as a new object when a comparison with already recognized objects has shown that it does not agree with these.

A base area of the object can be calculated from the position of the corner points of the projection of the object onto the X-Y plane, i.e. its plan view.

The volume of the object, or of the article represented by this, then results from the multiplication of the base area by the distance of the horizontal edges from the conveyor belt 10.

A new current horizontal edge is then selected from the remaining set of horizontal edges and the object location repeated. The result of the object formation is shown in FIG. 11.

At the end of this step, the location data and the calculated volumes of the located objects are output via the corresponding interface of the evaluation device 18, on the one hand, and new data are read via the input interfaces which were detected during the evaluation in a new scan, on the other hand.

What is claimed is:

1. A method of locating articles with a base surface of a predetermined type of surface shape, a top surface substantially parallel to the base surface and at least one side surface extending substantially orthogonally to the base surface on a support plane on the basis of data obtained by a relative movement extending in a transport direction parallel to the support plane between a scanning plane, which includes a predetermined angle with the support plane, and the articles and by repeatedly carrying out a total scan of the location of points on the articles within a detection region in the scanning plane, and which include information on the location of the points detected in the scanning plane and on the basis of information from which the relative position of the scanning plane and articles in the transport direction can be derived during a total scan, the method comprising the repeated performing of the steps of:

reading the data on the location of the points on the articles in the scanning plane and detecting information on the relative position of the scanning plane and articles in the transport direction for a current total scan;

determining positions and extents of flanks of the articles, which substantially form a right angle with the support plane, from the data of the current total scan;

determining positions and lengths of edges of the articles substantially parallel to the support plane on the basis of the positions and extents of the flanks as well as of the information on the relative position of the scanning plane and the articles in the transport direction in the current total scan and in preceding total scans; and defining objects corresponding to articles from the positions and lengths of the edges parallel to the support plane.

2. A method in accordance with claim 1, including using data which were obtained while using a scanning plane orthogonal to the support plane.

3. A method in accordance with claim 1, including subjecting the data to a spatial filtering with respect to a direction orthogonal to the support plane before the determining of the flanks.

4. A method in accordance with claim 1, including, for the recognition of the flanks, using magnitudes of distances of successive data points in a direction orthogonal to the support plane.

5. A method in accordance with claim 1, including obtaining positions of end points of the flanks in a direction parallel to an intersection line of the support plane and the scanning plane by averaging corresponding data of data points associated with the flank.

6. A method in accordance with claim 1, wherein a distance from the support plane or, a value of a coordinate in a direction orthogonal to the support plane, is associated with an end point of a flank and is obtained by averaging corresponding data from data points of a surface of a detected article adjacent to the flank at the end point and substantially orthogonal to the flank.

7. A method in accordance with claim 1, including associating a direction with an end point of a flank which specifies in which direction a surface of a detected article extends which adjoins the flank and is substantially orthogonal to it.

8. A method in accordance with claim 1, including determining the position of end points of the flanks of a total scan in the transport direction of the articles on the basis of the movement speed between the scanning plane and the articles and the time interval of the total scan from the current total scan.

9. A method in accordance with claim 1, including using the positions of end points of the flanks and the directions associated with the end points for determining the edges parallel to the support plane.

10. A method in accordance with claim 1 used to locate articles of right parallelepiped shape; and including generating a new object only when two edges substantially parallel to the support plane are found which have approximately the same distance from the support plane and include an angle whose magnitude is smaller than a predetermined limiting angle.

11. A method in accordance with claim 10, including generating a new object only when a different direction is associated with the end points which underlie the edge parallel to the support plane than with the end points which underlie the other edge parallel to the support plane.

12. A method in accordance with claim 1, including calculating the volume of at least one object on the basis of a base surface defined by edges of the object parallel to the support plane and the distance from the support plane of the edges parallel to the support plane.

13. A method of detecting articles with a base surface of a predetermined type of surface shape, a top surface substantially parallel to the base surface and one or more side surfaces extending substantially orthogonally to the base surface, in particular of articles of right parallelepiped shape, on a support plane, wherein a scanning plane, which substantially includes a predetermined angle with the support plane, and the articles are moved relative to one another in a transport direction parallel to the support plane, and a total scan of a detection region in the scanning plane is carried out repeatedly, in which data are detected on the location of points on the articles in the scanning plane as well as information from which the relative position of the scanning plane and articles in the transport direction can be derived during a total scan, the method comprising reading the data on the location of the points on the articles in the scanning plane and detecting information on the relative position of the scanning plane and articles in the transport direction for a current total scan;

determining positions and extents of flanks of the articles, which substantially form a right angle with the support plane, from the data of the current total scan;

determining positions and lengths of edges of the articles substantially parallel to the support plane on the basis of the positions and extents of the flanks as well as of the information on the relative position of the scanning plane and the articles in the transport direction in the current total scan and in preceding total scans; and defining objects corresponding to articles from the positions and lengths of the edges parallel to the support plane.

14. A method in accordance with claim 13, wherein the scanning plane is substantially aligned orthogonally to the support plane.

15. A method in accordance with claim 13, including detecting the data on the location of points on the articles with a laser measuring device having an areal detection region.

16. A method in accordance with claim 13, including using a laser measuring device which includes at least one scanner.

17. A method in accordance with claim 13, including at least two laser scanners arranged along a line orthogonal to the transport direction of the articles and above the support plane so that their detection regions overlap.

18. A method in accordance with claim 13, including moving the articles when the scanning plane is stationary.

19. An apparatus for the detection of articles with a base surface of a predetermined type of surface shape, a top surface substantially parallel the base surface and one or more side surfaces extending substantially orthogonally to the base surface on a support plane having at least one sensor for electromagnetic radiation with which data can be obtained with repeated total scans with respect to the location of points on the articles in a detection region in a scanning plane of the sensor and a device with which the articles and the sensor can be moved relative to one another in a transport direction parallel to the support plane, and wherein the scanning plane of the sensor includes a predetermined angle with the support plane; and a data processing device which reads the data on the location of the points on the articles in the scanning plane and detects information on the relative position of the scanning plane and articles in the transport direction for a current total scan;

determines positions and extents of flanks of the articles, which substantially form a right angle with the support plane, from the data of the current total scan;

determines positions and lengths of edges of the articles substantially parallel to the support plane on the basis of the positions and extents of the flanks as well as of the information on the relative position of the scanning plane and the articles in the transport direction in the current total scan and in preceding total scans; and defines objects corresponding to articles from the positions and lengths of the edges parallel to the support plane.

20. An apparatus in accordance with claim 19, wherein the scanning plane is aligned substantially orthogonally to the support plane.

21. An apparatus in accordance with claim 19, wherein the sensor is a laser scanner.

22. An apparatus in accordance with claim 21, including two laser scanners having scanning planes that are inclined at a predetermined angle to the support plane and that are arranged at a predetermined distance from and at both sides of a possible trajectory of the articles.

23. An apparatus in accordance with claim 19, wherein the device for the relative movement comprises a conveyor device for the articles.

24. A computer program comprising program code which, when the program is run on a computer, locates articles with a base surface of a predetermined type of surface shape, a top surface substantially parallel to the base surface and at least one side surface extending substantially orthogonally to the base surface on a support plane on the basis of data obtained by a relative movement extending in a transport direction parallel to the support plane between a scanning plane, which includes a predetermined angle with the support plane, and the articles and by repeatedly carrying out a total scan of the location of points on the articles within a detection region in the scanning plane, and which include information on the location of the points detected in the scanning plane and on the basis of information from which the relative position of the scanning plane and articles in the transport direction can be derived during a total scan by repeatedly reading the data on the location of the points on the articles in the scanning plane and detecting information on the relative position of the scanning plane and articles in the transport direction for a current total scan;

determining positions and extents of flanks of the articles, which substantially form a right angle with the support plane, from the data of the current total scan;

determining positions and lengths of edges of the articles substantially parallel to the support plane on the basis of the positions and extents of the flanks as well as of the information on the relative position of the scanning plane and the articles in the transport direction in the current total scan and in preceding total scans; and defining objects corresponding to articles from the positions and lengths of the edges parallel to the support plane.

25. A computer program product comprising program code stored in a data carrier readable by a computer for locating articles with a base surface of a predetermined type of surface shape, a top surface substantially parallel to the base surface and at least one side surface extending substantially orthogonally to the base surface on a support plane on the basis of data obtained by a relative movement extending in a transport direction parallel to the support plane between a scanning plane, which includes a predetermined angle with the support plane, and the articles and by repeatedly carrying out a total scan of the location of points on the articles within a detection region in the scanning plane, and which include information on the location of the points detected in the scanning plane and on the basis of information from which the relative position of the scanning plane and articles in the transport direction can be derived during a total scan by repeatedly reading the data on the location of the points on the articles in the scanning plane and detecting information on the relative position of the scanning plane and articles in the transport direction for a current total scan;

determining positions and extents of flanks of the articles, which substantially form a right angle with the support plane, from the data of the current total scan;

determining positions and lengths of edges of the articles substantially parallel to the support plane on the basis of the positions and extents of the flanks as well as of the information on the relative position of the scanning plane and the articles in the transport direction in the current total scan and in preceding total scans; and defining objects corresponding to articles from the positions and lengths of the edges parallel to the support plane.

26. A method of locating articles with a base surface of a predetermined type of surface shape, a top surface substantially parallel to the base surface and at least one side surface extending substantially orthogonally to the base surface on a support plane on the basis of data obtained by a relative movement in a transport direction parallel to the support plane between a scanning plane, which includes a predetermined angle with the support plane, and the articles and by repeatedly carrying out a total scan of the location of points on the articles within a detection region in the scanning plane, and which include information on the location of the points detected in the scanning plane and on the basis of information from which the relative position of the scanning plane and articles in the transport direction can be derived during a total scan, the method comprising the repeated performing of the steps of:

reading the data on the location of the points in the scanning plane and detecting information on the relative position of the scanning plane and articles in the transport direction for a current total scan;

determining positions and extents of flanks of the articles, which substantially form a right angle with the support plane, including extents of the flanks in a direction orthogonal to the support plane, from the data of the current total scan;

determining positions and lengths of edges of the articles substantially parallel to the support plane on the basis of the positions and extents of the flanks as well as of the information on the relative position of the scanning plane and the articles in the transport direction in the current total scan and in preceding total scans; and defining objects corresponding to articles from the positions and lengths of the edges parallel to the support plane.

* * * * *